United States Patent
Mandal et al.

(10) Patent No.: US 10,831,999 B2
(45) Date of Patent: Nov. 10, 2020

(54) TRANSLATION OF TICKET FOR RESOLUTION

(71) Applicant: International Business Machines Corporation, Armonk, NY (US)

(72) Inventors: Atri Mandal, Bangalore (IN); Giriprasad Sridhara, Bangalore (IN); Vijay Ekambaram, Chennai (IN); Gargi Banerjee Dasgupta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 16/286,036

(22) Filed: Feb. 26, 2019

(65) Prior Publication Data

US 2020/0272691 A1 Aug. 27, 2020

(51) Int. Cl.
*G06F 40/295* (2020.01)
*G06Q 30/00* (2012.01)

(52) U.S. Cl.
CPC ......... *G06F 40/295* (2020.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 5,875,421 | A * | 2/1999 | Takeuchi | G06F 40/58 704/2 |
| 6,311,150 | B1 * | 10/2001 | Ramaswamy | G06F 40/279 704/1 |
| 6,857,022 | B1 * | 2/2005 | Scanlan | G06F 40/58 709/229 |
| 6,952,665 | B1 * | 10/2005 | Shimomura | G06F 40/58 704/2 |
| 7,124,073 | B2 * | 10/2006 | Tokuda | G06F 40/279 704/2 |
| 7,409,333 | B2 | 8/2008 | Wilkinson et al. | |
| 7,630,961 | B2 * | 12/2009 | Middelfart | G06F 16/3337 |
| 8,370,131 | B2 * | 2/2013 | Choi | G06F 40/242 704/10 |
| 8,676,563 | B2 * | 3/2014 | Soricut | G06F 40/58 704/2 |

(Continued)

*Primary Examiner* — Thuykhanh Le
(74) *Attorney, Agent, or Firm* — Ference & Associates, LLC (57) ABSTRACT

One embodiment provides a method, including: receiving a foreign language trouble ticket requiring resolution; translating text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously resolved tickets by: extracting keywords from the historical tickets, wherein the keywords are recognized as corresponding to an identified portion; and generating at least one keyword link from at least one of the identified portions identified as a problem description portion; and directing the known language ticket to a resolver group, wherein the resolver group is selected based upon an issue identified within the ticket.

20 Claims, 3 Drawing Sheets

(56) References Cited

U.S. PATENT DOCUMENTS

| | | | |
|---|---|---|---|
| 8,942,973 B2* | 1/2015 | Viswanathan | G06F 40/284 704/5 |
| 9,063,931 B2* | 6/2015 | Wu | G06F 40/42 |
| 9,459,950 B2 | 10/2016 | Bhamidipaty et al. | |
| 9,613,026 B2* | 4/2017 | Hodson | G06F 40/40 |
| 10,592,614 B1* | 3/2020 | Shaiovitch | G06Q 30/016 |
| 2002/0138250 A1* | 9/2002 | Okura | G06F 40/47 704/2 |
| 2004/0064305 A1* | 4/2004 | Sakai | G06F 40/268 704/9 |
| 2005/0010419 A1* | 1/2005 | Pourhamid | G06F 40/47 704/277 |
| 2005/0267738 A1* | 12/2005 | Wilkinson | G06Q 10/107 704/9 |
| 2006/0142994 A1* | 6/2006 | Zhou | G06F 40/253 704/9 |
| 2007/0016401 A1* | 1/2007 | Ehsani | G10L 15/005 704/9 |
| 2007/0112553 A1* | 5/2007 | Jacobson | G06F 40/47 704/2 |
| 2009/0063125 A1* | 3/2009 | Faisman | G06F 40/58 704/2 |
| 2009/0287671 A1* | 11/2009 | Bennett | G06F 16/951 |
| 2010/0204981 A1* | 8/2010 | Ribeiro | G06F 40/58 704/8 |
| 2011/0178792 A1* | 7/2011 | Shi | G06F 40/51 704/3 |
| 2013/0226846 A1* | 8/2013 | Li | G06N 5/02 706/12 |
| 2013/0346064 A1* | 12/2013 | Chen | G06F 40/58 704/8 |
| 2014/0129536 A1 | 5/2014 | Anand et al. | |
| 2014/0229175 A1* | 8/2014 | Fischer | G10L 15/22 704/235 |
| 2015/0006143 A1* | 1/2015 | Skiba | G06F 40/30 704/2 |
| 2016/0321361 A1* | 11/2016 | Caskey | G06F 16/951 |
| 2016/0352674 A1 | 12/2016 | Strom | |
| 2018/0032971 A1 | 2/2018 | Karuppasamy et al. | |
| 2019/0348028 A1* | 11/2019 | Skobeltsyn | G06F 3/167 |

* cited by examiner

TRANSLATION OF TICKET FOR RESOLUTION

BACKGROUND

Many entities (e.g., corporations, groups, individuals, etc.) work with other entities that may correspond in a different language. For example, a large corporation may have different groups that are located in different geographic locations that each have an associated language, for example, one group may be in France and correspond in French, while another group is in Germany and corresponds in German. Communications between these entities may be difficult if some members or a portion of one of the entities cannot correspond in the other language. For example, if no one in the group in France can correspond in German, and none of people in the group in Germany can correspond in French, communications between the two groups may be very difficult. Thus, many entities employ a translator, either a person or machine, which can translate between the two languages.

BRIEF SUMMARY

In summary, one aspect of the invention provides a method comprising: receiving a foreign language trouble ticket requiring resolution, wherein text of the ticket is in a language unknown to a person who resolves the foreign language trouble ticket; translating text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously resolved tickets to translate the foreign language into the known language, wherein the keyword links are generated by: extracting keywords from the historical tickets provided in the foreign language, wherein the keywords are recognized as corresponding to an identified portion of the historical foreign language tickets based upon a training phase, wherein at least one of the identified portions comprises a resolution provided in the known language; and generating at least one keyword link from at least one of the identified portions identified as a problem description portion, wherein the at least one keyword link comprises a foreign language version of at least one of the identified portions identified as a problem description portion and a corresponding known language version of the same portion; and directing the known language ticket to a resolver group, wherein the resolver group is selected based upon an issue identified within the ticket.

Another aspect of the invention provides an apparatus, comprising: at least one processor; and a computer readable storage medium having computer readable program code embodied therewith and executable by the at least one processor, the computer readable program code comprising: computer readable program code configured to receive a foreign language trouble ticket requiring resolution, wherein text of the ticket is in a language unknown to a person who resolves the foreign language trouble ticket; computer readable program code configured to translate text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously resolved tickets to translate the foreign language into the known language, wherein the keyword links are generated by: extracting keywords from the historical tickets provided in the foreign language, wherein the keywords are recognized as corresponding to an identified portion of the historical foreign language tickets based upon a training phase, wherein at least one of the identified portions comprises a resolution provided in the known language; and generating at least one keyword link from at least one of the identified portions identified as a problem description portion, wherein the at least one keyword link comprises a foreign language version of at least one of the identified portions identified as a problem description portion and a corresponding known language version of the same portion; and computer readable program code configured to direct the known language ticket to a resolver group, wherein the resolver group is selected based upon an issue identified within the ticket.

An additional aspect of the invention provides a computer program product, comprising: a computer readable storage medium having computer readable program code embodied therewith, the computer readable program code executable by a processor and comprising: computer readable program code configured to receive a foreign language trouble ticket requiring resolution, wherein text of the ticket is in a language unknown to a person who resolves the foreign language trouble ticket; computer readable program code configured to translate text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously resolved tickets to translate the foreign language into the known language, wherein the keyword links are generated by: extracting keywords from the historical tickets provided in the foreign language, wherein the keywords are recognized as corresponding to an identified portion of the historical foreign language tickets based upon a training phase, wherein at least one of the identified portions comprises a resolution provided in the known language; and generating at least one keyword link from at least one of the identified portions identified as a problem description portion, wherein the at least one keyword link comprises a foreign language version of at least one of the identified portions identified as a problem description portion and a corresponding known language version of the same portion; and computer readable program code configured to direct the known language ticket to a resolver group, wherein the resolver group is selected based upon an issue identified within the ticket.

A further aspect of the invention provides a method, comprising: generating a plurality of keyword links, wherein the keyword links are used to translate a problem ticket from a first language to a second language, wherein the generating a plurality of keyword links comprises: obtaining a plurality of problem tickets that have a resolution, wherein the resolution is provided in the second language and wherein each of the plurality of problem tickets has a related problem ticket provided in the first language; extracting at least one problem description from a first problem ticket in the first language from the plurality of problem tickets; extracting a resolution in the second language from a second problem ticket related to the first problem ticket; from the extracted resolution, determining a problem description for the second language; and creating, from the extracted at least one problem description and the determined problem description, a keyword link that links the problem description of the second problem ticket to the extracted problem description of the first problem ticket, wherein the keyword link represents a translation of the problem description in the first language to the problem description in the second language.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Traditionally translators have been human beings or users that are familiar with two or more languages. The translator may work as an intermediary between a first group that corresponds in one language and a second group that corresponds in another different language. The translator is able to translate communications from the first group into the language of the second group and vice versa. Translators are a highly trained group of people and may be very difficult to find. Accordingly, an increase in digital or computer-based translators is becoming prevalent. The digital translators are able to take correspondence provided in a first language and translate it to a second language using a corpus of keyword links or translation tuples. The keyword links or translation tuples identify a link between a word or phrase in a first language and a word or phrase in a second language. These translation tuples are traditionally generated manually by a human translator, who takes a large corpus of documents and translates the documents from one language to another. The system then learns which words or phrases of one language correspond to words or phrases from another language based upon a comparison of the original documents to the translated documents.

Digital translators are often used in conjunction with other digital or automatic applications. For example, a trouble ticket routing system may include an automatic router that can identify an issue in a trouble ticket and route the ticket to the appropriate technical group, called a resolver group. Traditionally, the automatic or digital router has been used in conjunction with a human translator when trouble tickets are generated in a foreign language with respect to the language of the resolver. The human translator translates the ticket from the first language to the language known to the resolver. The automatic router can then route the ticket to the correct resolver group by using the translated ticket to identify the issue that needs to be resolved and then routing it to the resolver group that resolves those types of issues. However, as stated above, it may be difficult to find a human translator to perform these translations. Additionally, if the tickets are highly technical, the translator may not have the technical knowledge to correctly translate the ticket to the language of the resolver correctly. In other words, the translation is based upon the translator's knowledge and so the translation may be incorrect.

Accordingly, some entities employ digital or automatic translators to translate the tickets. As stated above, these automatic translators rely on keyword links or translation tuples to translate a document from a first language to a second language. Such a technique works relatively well on documents that follow proper grammar and spelling rules. However, the automatic translators have difficulty in translating slang, abbreviations, shortened forms of words or phrases, colloquial language, or the like, which may be frequently found in casual communications, for example, emails, text messages, instant messages, and the like. Many problem tickets are generated in email form, and, therefore, include many casual communication words. Thus, the automatic translators have a very difficult time translating the problem tickets correctly. Accordingly, many times the problem tickets end up translated incorrectly, have words that go untranslated, have poor grammar, are nonsensical due to the poor translation, or the like. Thus, the resolver may provide the wrong resolution to the problem ticket or may spend a significant amount of time attempting to determine what the actual problem is before it can be resolved.

The conventional solution to this problem is to have a human translator manually create translation tuples from a large corpus of emails. The automatic translator can then use these translation tuples, which are specifically created from emails, to assist in translating the problem tickets. However, such a technique is very time-consuming and often times ineffective, since there are so many ways to write the same phrases. Additionally, finding a translator, particularly a translator versed in technical issues and technical language is not always easy.

Accordingly, the techniques and systems as described herein provide a system and technique for translating a ticket received in a foreign language to a known language using keyword links or translation tuples that are generated from historical tickets. The system receives a ticket requiring resolution, referred to as a problem or trouble ticket, which is provided in a foreign language. The language is considered foreign because it is a language that is unknown to the resolver that will resolve the problem ticket. The system then translates the foreign language ticket into a known language ticket. The known language ticket is a representation of the foreign language ticket in a language that is known to the resolver.

To translate the foreign language ticket, the system uses keyword links or translation tuples that are generated from historical tickets to convert keywords or entities (e.g., problem description, symptom, action, etc.) within the foreign language ticket into known language keywords, entities, or portions. These keyword links or translation tuples can be automatically created by extracting keywords or entities from the historical tickets that are provided in the foreign language. Specifically, the system extracts the keywords that correspond to the portions that are useful for resolving the problem, for example, the problem description, action, symptom, and the like, versus salutations, valedictions, extraneous conversation, and the like. Additionally, the system captures the resolution of the ticket, where the resolution is provided in the known language.

From the extracted keywords or entities and the resolution, the system can generate the keyword links or translation tuples. If the resolution additionally contains a description of the problem, then the system can simply link the description of the problem provided in the known language to the description of the problem provided in the foreign language to generate the keyword link or translation tuple. If, however, the resolution does not contain a description of the problem, the system can generate translation tuples in one of two ways. First, the system can compare the resolution to known problem resolutions. In other words, the system can identify if the resolution has previously been performed in another translated ticket, and if it has, what translated problem description is associated with that translated ticket. The system can then link the known problem description to the foreign language problem description entity, thereby generating a translation tuple. Alternatively, if the resolution does not correspond to a resolution having a known problem description, the system may use a modified word2vec technique that allows for correlating phrases included in the resolution to known problems resolved by an assigned resolver group and generating a problem description. This generated problem description can then be linked to the foreign language problem description entity and used to generate a translation tuple. Once the foreign language ticket has been translated using the translation tuples, the system can direct the translated ticket to the appropriate resolver group.

Such a system provides a technical improvement over current systems for translations of problem tickets. Rather than requiring a human translator, the system can automatically translate the problem ticket from one language to another, even if the problem ticket includes very casual content. The system can automatically generate keyword links or translation tuples from historical problem tickets, thereby reducing the need for a human translator to spend a large amount of time translating historical emails or problem tickets. Additionally, since the automatic translator can automatically generate translation tuples, the system is able to provide translations of technical content which may not be known to a human translator. Thus, the described system and method provide a more accurate, effective, and efficient translation of problem tickets than conventional manual translation techniques.

Figure 1:
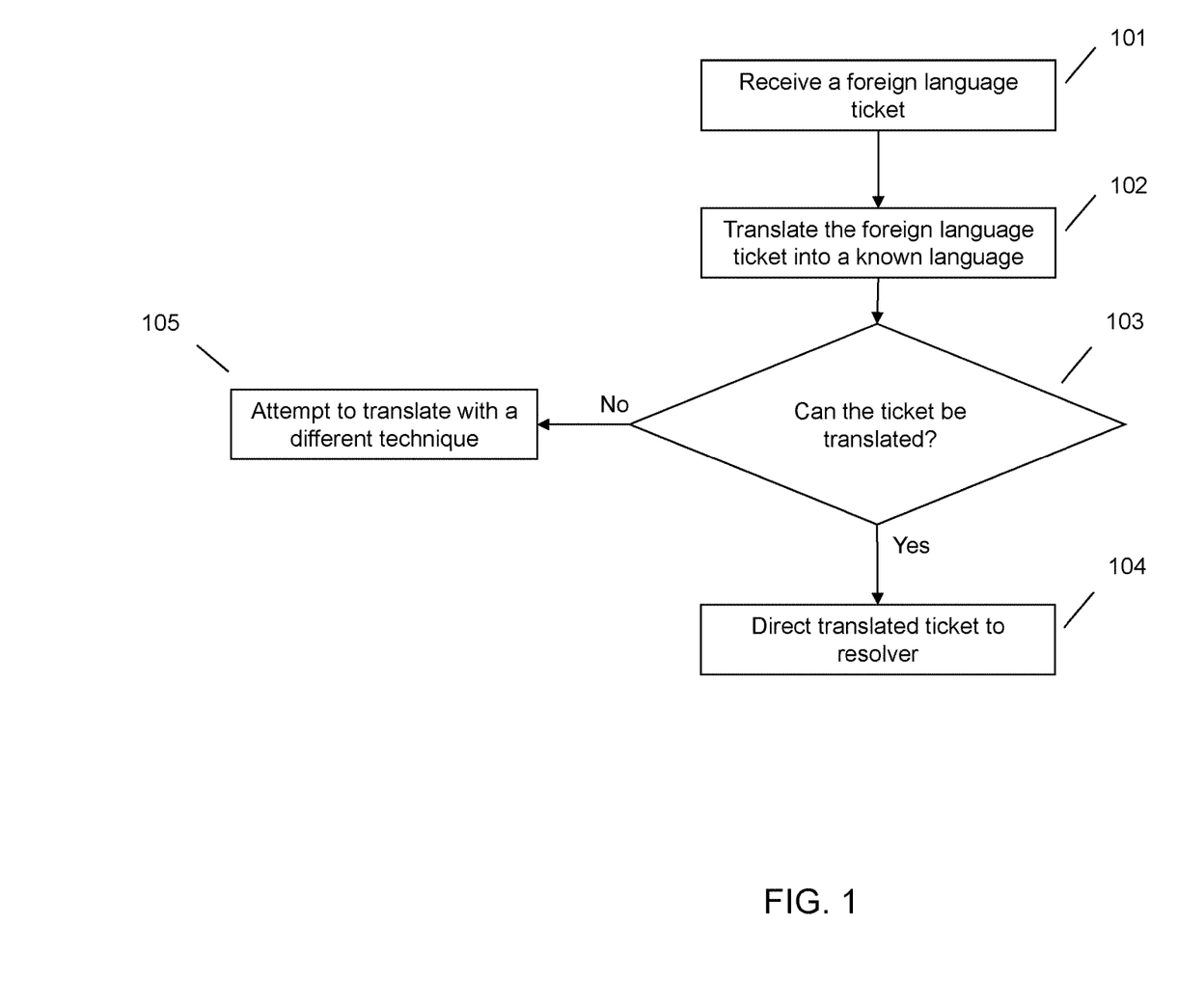
FIG. 1 illustrates a method of translating a ticket received in a foreign language to a known language using keyword links that are generated from historical tickets.
Figure 2:
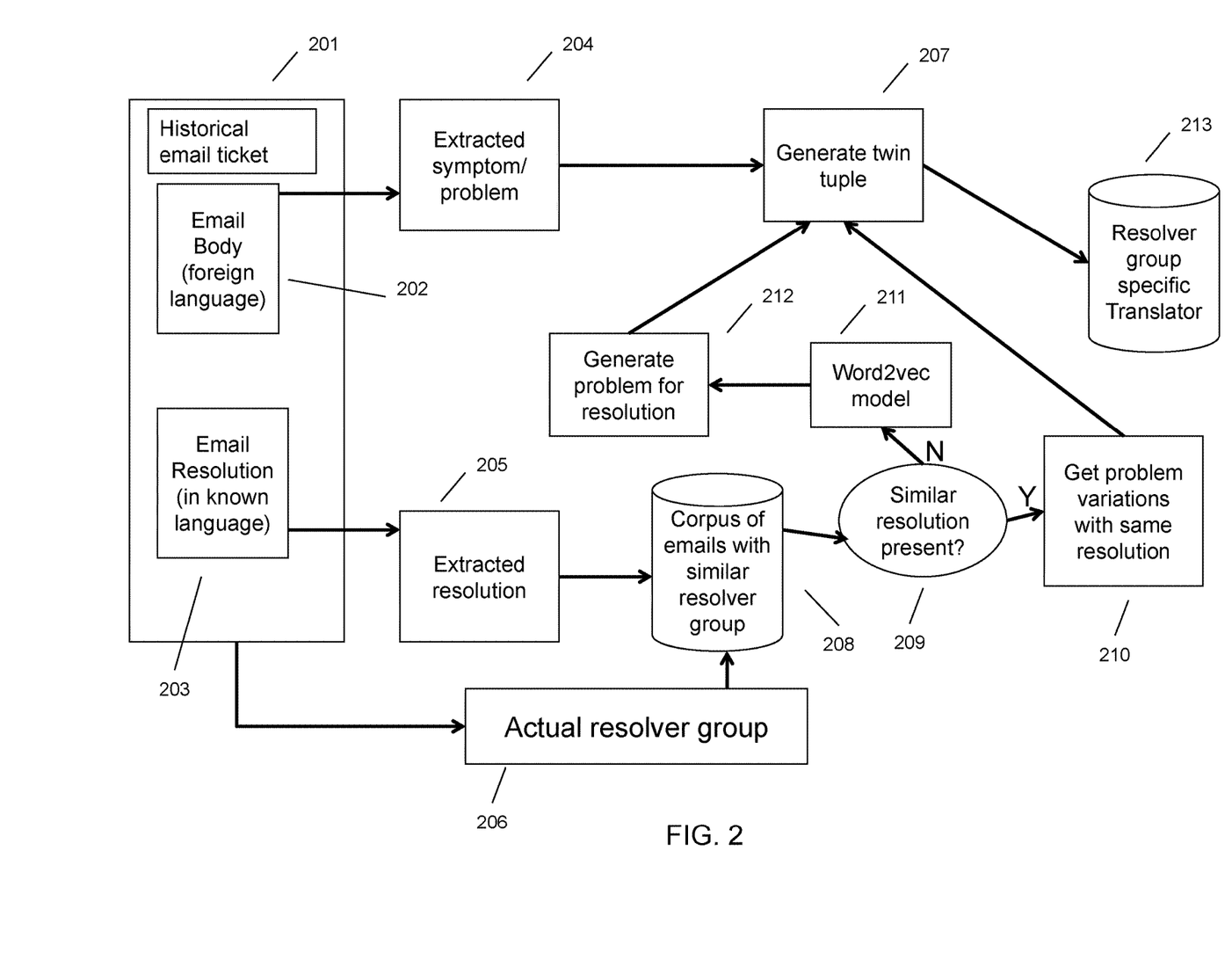
FIG. 2 illustrates an example system for training a translation system to generate keyword links.

FIG. 1 illustrates a method for translating a ticket received in a foreign language to a known language using keyword links or translation tuples that are generated from historical tickets. At 101 the system may receive a foreign language trouble or problem ticket requiring resolution. The ticket may be obtained in a variety of ways, for example, by the entity that needs assistance uploading or sending the ticket to a ticket help desk, by the system pulling tickets from a queue or database that stores problem tickets, or the like. In other words, the system may receive the ticket from an entity or application or may access and acquire the ticket from an entity or application. The ticket is considered to be in a foreign language because the language of the ticket is unknown to the resolver, user, or other person who is going to resolve the problem ticket. In other words, the problem ticket is in a language different than a language known by the person who resolves the ticket. Additionally, the ticket may include casual communication content (e.g., colloquialisms, slang, abbreviations, shortened versions of words or phrases, etc.), which are typically difficult for automatic translators to translate correctly.

At 102 the system may translate the problem ticket from the foreign language into a known language, thereby creating a known language ticket. The known language is a language that is known to the resolver. To translate the problem ticket into the known language, the system uses keyword links or translation tuples. These translation tuples are automatically generated by the system from historical tickets that include a problem ticket that was provided in the foreign language and a resolution of the problem ticket, where the resolution is provided in the known language. The resolver generally describes and notates the resolution of a problem ticket and this resolution is provided in the language known to the resolver. Thus, each problem ticket has a foreign language component that is the submitted problem ticket and a known language component which is provided by the resolver. From these components, the system can generate the translation tuples that include foreign language keywords or entities and corresponding known language keywords or entities. These translation tuples can thereafter be used to translate newly submitted foreign language problem tickets into a known language.

For example, the system, upon receipt of a new or foreign language trouble ticket, may translate a subset of the foreign language ticket into a known language. This subset may correspond to a portion identified as corresponding to a problem portion of the trouble ticket. The subset may also only include a small portion of the words within the foreign language ticket, for example, the words or keywords that the system has a high confidence as being translated correctly. To translate the remaining subset or portion of the foreign language ticket, or a remaining portion that is identified as pertinent to the problem within the trouble ticket, the system may use the keyword links or translation tuples.

Generation of the translation tuples may occur in a training phase for the automatic translator. Such a training phase is illustrated in FIG. 2. At 201 the system obtains the historical email tickets. Each of these tickets, as discussed above, have an email body provided in a foreign language 202, for example, the original problem ticket, and an email resolution provided in a known language 203, for example, the resolution provided by the resolver after resolving the ticket. The system then extracts keywords or entities from the historical tickets 204, for example, using an entity extractor, a symptom reader, or the like. Keywords or entities may include portions of the historical foreign language ticket that are used resolve problems, for example, a symptom, a problem, an action, and the like, as opposed to extraneous communication, salutations, valedictions, and the like. Thus, the keywords or entities may include a single word, phrase, or an entire description or portion of the ticket. The system may also extract keywords or entities from the resolution 205, for example, the resolution steps, a description of the problem if included, and the like.

In the case that the extracted resolution also includes a problem description, the system can simply send the foreign language problem description entity and the problem description entity provided in the known language in the resolution to the twin tuple generation 207. The twin tuple generation 207 then links the foreign language problem description to the known language problem description to generate the translation tuple. In other words, generating the translation tuple may include correlating or linking the foreign language version of a problem description entity that was extracted from the foreign language ticket to a known language problem description entity that was included in the resolution provided in the known language.

Additionally, the system may identify which resolver group the ticket was sent to 206. The resolver group is a group that includes individuals who will resolve particular types of problems. Thus, each resolver group is associated with certain problem categories. For example, one resolver group may resolve log-on issues, while another resolver group may resolve system error messages. Each resolver group may have a corpus of emails 208 that includes emails resolved by that resolver group. In the case that the resolution does not include a problem description, the system may use the corpus of emails 208 that belong to the resolver group to attempt to identify a known problem. Specifically, the system may compare the resolution steps of a current problem ticket to the resolution steps of problem tickets that have already been resolved. In other words, the system may attempt to determine whether a similar resolution is present within the corpus of emails 209.

If one or more emails do have similar resolution steps, then the system can access those historical emails to identify the problem description 210 in the known language. In other words, if the current problem ticket has the same or similar resolution steps as a resolved problem ticket, where the resolved problem ticket either explicitly identifies the problem description or the problem description can be identified from information in the resolve problem ticket, the system can identify that known problem as being the same problem for the current problem ticket. Thus, since the current ticket now has a known language problem description, the system can link the known problem description to the foreign problem description identified from the foreign problem ticket to generate the translation tuple 207.

Similarly, the system may use attachments to the resolution or problem ticket to identify resolved problem tickets that are similar to the current problem ticket. For example, the system may compare attachments or screenshots included with the current problem ticket to attachments or screenshots included with the resolved problem tickets. The system can identify different ontological elements included in the attachments or screenshots. If these ontological elements can be mapped to ontological elements of resolved problem tickets, the system may identify the resolved problem ticket having ontological elements similar to those of the current problem ticket as being a similar problem ticket. Thus, the system can use the problem description provided in the known language and associated with the resolved problem ticket, as the problem description for the current problem ticket. This problem description can then be linked to the foreign language problem description and used to generate the translation tuple 207.

If, however, the email corpus 208 does not have a problem ticket that has the same or similar resolution as identified at 209, the system may use a different technique to generate the translation tuple. Specifically, the system may use a modified word2vec model 211 to generate a natural language problem description for the known language resolution 212. The word2vec representation can be created using words from the resolution text and those from the problem description. The customized word2vec model is based upon the idea that words mentioned in the problem ticket to describe the problem are closely related to words that are provided by the resolver in the resolution description. Since the context of problem tickets is technical, a traditional word2vec model may not identify two words as being related. For example, a traditional word2vec model may not identify that the words "password" and "login" are related because they are only related based upon the context of a technical problem. Thus, the system utilizes a modified word2vec model that takes into account the context of the words.

The modified word2vec model may run an entity extraction algorithm to extract entities from resolutions provided in a known language. These entities can then be analyzed by the word2vec model in order to link words that are related.

Based upon these linked words, the system can infer a problem from the resolution text. Inferring the problem may include mapping the "answer" (i.e., the resolution steps) to a "question" (i.e., a problem description). To map the answer to a question, the system may access resolved historical emails that have an identified problem description, and identify emails that have resolution steps that can be linked, using the word2vec model, to the resolution steps of the current problem ticket.

Additionally, to assist the word2vec model, the system may attempt to predict a resolver group that the ticket will be sent to. In attempting to predict the resolver group, the system may use a default translator to attempt to translate the foreign language ticket. By knowing or predicting the resolver group, the system can use information associated with the resolver group to assist in translating the foreign language ticket. For example, the system may know what types or categories of problems the predicted resolver group resolves. This category of problems can then be used in the modified word2vec system to generate a natural language problem description for the foreign language ticket. In other words, the system can attempt to classify the problem ticket into a problem category by associating the problem category of the predicted resolver group to the current problem ticket.

From the linked words and problem identification, the system can generate a natural language problem description using a natural language processing techniques for the current problem ticket. The generated natural language problem description in the known language can then be linked to the foreign language problem description to generate a translation tuple. Once the translation tuple is generated, using any of the above mentioned techniques or a combination thereof, the system can store the translation tuple in a database, for example, a translation tuple database or translator associated with the identified or predicted resolver group 213, an overall problem ticket database or translator, or the like. In other words, the entities in the known language, for example, the problem description entity in the known language, and the corresponding foreign language entity can be added to and stored in a database as a translation tuple.

Once the system is trained, the system can be used to translate the foreign language ticket that was received at 101. Thus, at 103, the system may determine whether the foreign language ticket can be translated. This determination is made based upon the result of the translation attempted at 102. If the translation was unsuccessful at 102, the system may attempt to translate the foreign language ticket using a different technique (e.g., using a translation technique described above but not used, using a human translator, using a default translator, etc.) at 105. If, however, the ticket can be translated, the system will direct the translated or known language ticket to a resolver or resolver group at 104. The resolver group can be selected using traditional resolver group selection techniques, for example, based upon issues identified within the ticket.

Thus, the described system and method provide an improvement over a conventional system for translating problem tickets by providing a system that can automatically and accurately translate a problem ticket, even if the problem ticket includes casual communication content that is traditionally very difficult for an automatic translator to correctly translate. Rather than requiring a human translator to manually translate emails that can be used by the system to generate translation tuples, the system can automatically create translation tuples from historical tickets that have been resolved. Thus, the system provides a more efficient and effective method for translating problem tickets than conventional methods that require time-consuming manual translations.

Figure 3:
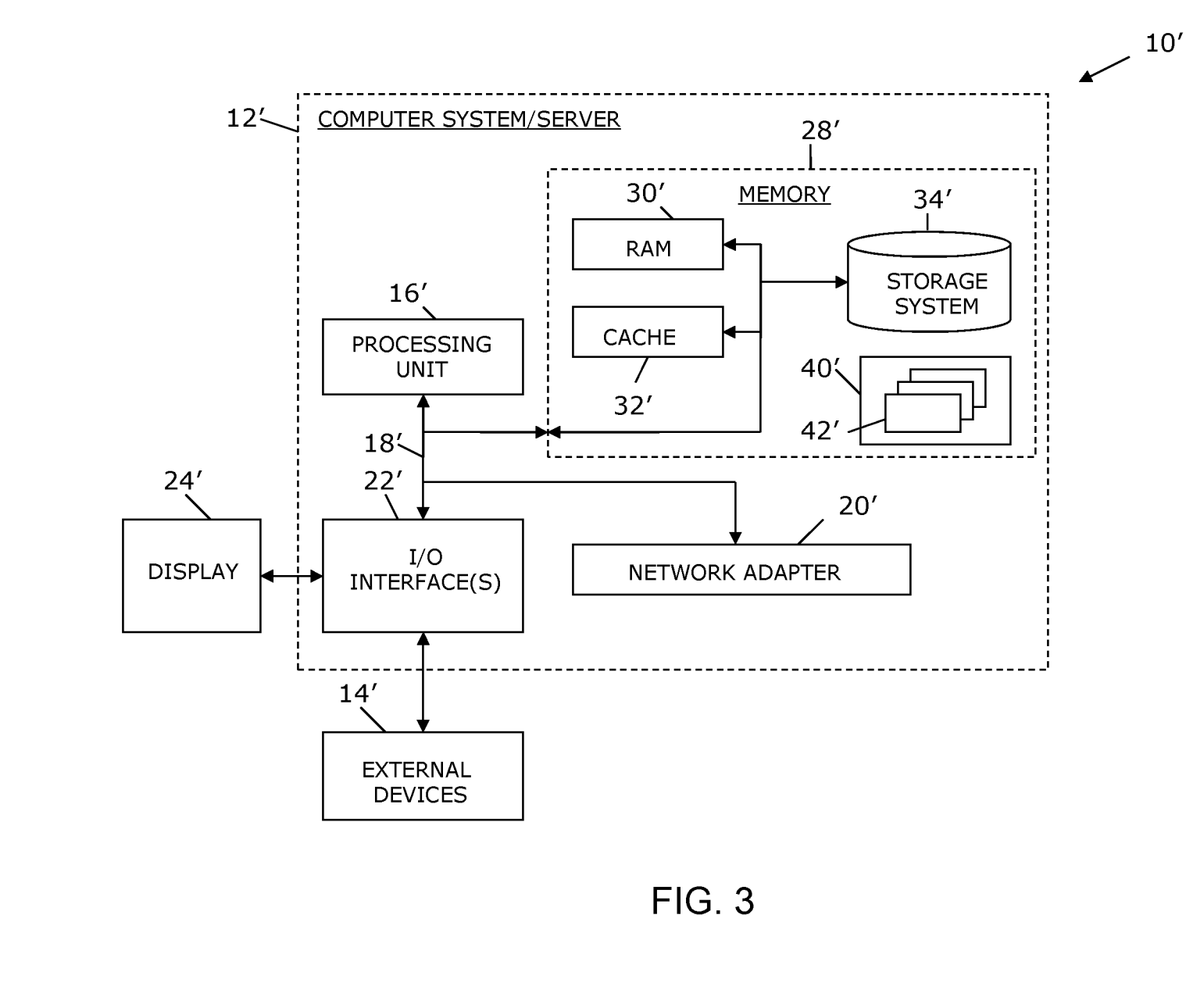
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/ server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving a foreign language trouble ticket requiring resolution, wherein text of the ticket is in a language unknown to a person who resolves the foreign language trouble ticket;
   translating text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously resolved tickets to translate the foreign language into the known language, wherein the keyword links are generated by:
   extracting keywords from the previously resolved tickets provided in the foreign language, wherein the keywords are recognized as corresponding to an identified portion of the previously resolved foreign language tickets based upon a training phase, wherein at least one of the identified portions comprises a resolution provided in the known language; and
   generating at least one keyword link from at least one of the identified portions identified as a problem description portion, wherein the at least one keyword link comprises a foreign language version of at least one of the identified portions identified as a problem description portion and a corresponding known language version of the same portion; and
   directing the known language ticket to a resolver group, wherein the resolver group is selected based upon an issue identified within the ticket.

2. The method of claim 1, wherein the generating at least one keyword link comprises correlating the foreign language version of at least one of the identified portions identified as a problem description portion to a portion identified as a problem description portion provided in the known language resolution.

3. The method of claim 1, wherein the generating at least one keyword link comprises correlating the known language resolution to a known problem by identifying known problems having a resolution similar to the known language resolution.

4. The method of claim 3, wherein the generating at least one keyword link comprises linking the known problem to the foreign language version of at least one of the identified portions identified as a problem description portion.

5. The method of claim 1, wherein the generating at least one keyword link comprises (i) correlating attachments included with a foreign language ticket to an attachment included with a previously resolved ticket having a known problem and (ii) linking the known problem to the foreign language version of at least one of the identified portions identified as a problem description portion.

6. The method of claim 1, wherein the generating at least one keyword link comprises determining that the resolution does not correspond to a known problem.

7. The method of claim 6, wherein the generating at least one keyword link comprises using a word2vec representation to link phrases within the resolution as being related and correlating the linked phrases to a resolver group, wherein the resolver group is associated with a category of problems.

8. The method of claim 7, wherein the generating at least one keyword link comprises (i) generating a problem description from the category of problems and the linked phrases using a natural language generation technique and (ii) linking the generated problem description to the foreign language version of an extracted portion identified as a problem description portion.

9. The method of claim 1, comprising adding portions of the known language ticket and corresponding portions of the foreign language ticket to a database storing the keyword links.

10. The method of claim 1, wherein the extracting portions comprises using at least one of: an entity extractor and a symptom reader.

11. An apparatus, comprising:
    at least one processor; and
    a computer readable storage medium having computer readable program code embodied therewith and executable by the at least one processor, the computer readable program code comprising:
    computer readable program code configured to receive a foreign language trouble ticket requiring resolution, wherein text of the ticket is in a language unknown to a person who resolves the foreign language trouble ticket;
    computer readable program code configured to translate text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously resolved tickets to translate the foreign language into the known language, wherein the keyword links are generated by:
    extracting keywords from the previously resolved tickets provided in the foreign language, wherein the keywords are recognized as corresponding to an identified portion of the previously resolved foreign language tickets based upon a training phase, wherein at least one of the identified portions comprises a resolution provided in the known language; and
    generating at least one keyword link from at least one of the identified portions identified as a problem description portion, wherein the at least one keyword link comprises a foreign language version of at least one of the identified portions identified as a problem description portion and a corresponding known language version of the same portion; and
    computer readable program code configured to direct the known language ticket to a resolver group, wherein the resolver group is selected based upon an issue identified within the ticket.

12. A computer program product, comprising:
a computer readable storage medium having computer readable program code embodied therewith, the computer readable program code executable by a processor and comprising:
computer readable program code configured to receive a foreign language trouble ticket requiring resolution, wherein text of the ticket is in a language unknown to a person who resolves the foreign language trouble ticket;
computer readable program code configured to translate text of the foreign language trouble ticket into a language known to the person, wherein the translating comprises (i) translating a subset of foreign language keywords within a portion of the foreign language trouble ticket identified as a problem portion into the known language and (ii) translating a remaining subset of keywords into the known language using keyword links generated from previously, resolved tickets to translate the foreign language into the known language, wherein the keyword links are generated by:
extracting keywords from the previously resolved tickets provided in the foreign language, wherein the keywords are recognized as corresponding to an identified portion of the previously resolved foreign language tickets based upon a training phase, wherein at least one of the identified portions comprises a resolution provided in the known language; and
generating at least one keyword link from at least one of the identified portions identified as a problem description portion, wherein the at least one keyword link comprises a foreign language version of at least one of the identified portions identified as a problem description portion and a corresponding known language version of the same portion; and
computer readable program code configured to direct the known language ticket to a resolver group, wherein the resolver group is selected based upon an issue identified within the ticket.

13. The computer program product of claim 12, wherein the generating at least one keyword link comprises correlating the foreign language version of at least one of the identified portions identified as a problem description portion to a portion identified as a problem description portion provided in the known language resolution.

14. The computer program product of claim 12, wherein the generating at least one keyword link comprises (i) correlating the known language resolution to a known problem by identifying known problems having a resolution similar to the known language resolution and (ii) linking the known problem to the foreign language version of at least one of the identified portions identified as a problem description portion.

15. The computer program product of claim 12, wherein the generating at least one keyword link comprises (i) correlating attachments included with a foreign language ticket to an attachment included with a previously resolved ticket having a known problem and (ii) linking the known problem to the foreign language version of at least one of the identified portions identified as a problem description portion.

16. The computer program product of claim 12, wherein the generating at least one keyword link comprises determining that the resolution does not correspond to a known problem.

17. The computer program product of claim 16, wherein the generating at least one keyword link comprises using a word2vec representation to link phrases within the resolution as being related and correlating the linked phrases to a resolver group, wherein the resolver group is associated with a category of problems.

18. The computer program product of claim 17, wherein the generating at least one keyword link comprises (i) generating a problem description from the category of problems and the linked phrases using a natural language generation technique and (ii) linking the generated problem description to the foreign language version of an extracted portion identified as a problem description portion.

19. The computer program product of claim 12, comprising adding portions of the known language ticket and corresponding portions of the foreign language ticket to a database storing the keyword links.

20. A method, comprising:
generating a plurality of keyword links, wherein the keyword links are used to translate a problem ticket from a first language to a second language, wherein the generating the plurality, of keyword links comprises:
obtaining a plurality of problem tickets that have a resolution, wherein the resolution is provided in the second language and wherein each of the plurality of problem tickets has a related problem ticket provided in the first language;
extracting at least one problem description from a first problem ticket in the first language from the plurality of problem tickets;
extracting a resolution in the second language from a second problem ticket related to the first problem ticket;
from the extracted resolution, determining a problem description for the second problem ticket in the second language; and
creating, from the at least one extracted problem description from the first problem ticket and the determined problem description of the second problem ticket, a keyword link that links the determined problem description of the second problem ticket to the extracted problem description of the first problem ticket, wherein the keyword link represents a translation of the problem description in the first language to the problem description in the second language.

* * * * *